United States Patent
Shavro (10) Patent No.: US 10,491,629 B2
(45) Date of Patent: Nov. 26, 2019

(54) DETECTING SENSITIVE DATA SENT FROM CLIENT DEVICE TO THIRD-PARTY

(71) Applicant: Synopsys, Inc., Mountain View, CA (US)

(72) Inventor: Tamir Shavro, Hertzelia (IL)

(73) Assignee: Synopsys, Inc., Mountain View, CA (US)

( * ) Notice: Subject to any disclaimer, the term of this patent is extended or adjusted under 35 U.S.C. 154(b) by 294 days.

(21) Appl. No.: 15/425,985

(22) Filed: Feb. 6, 2017

(65) Prior Publication Data

US 2018/0227326 A1  Aug. 9, 2018

(51) Int. Cl.
*H04L 29/06* (2006.01)
*G06F 21/62* (2013.01)
*H04L 29/08* (2006.01)

(52) U.S. Cl.
CPC ...... *H04L 63/1475* (2013.01); *G06F 21/6245* (2013.01); *H04L 67/34* (2013.01); *H04L 67/02* (2013.01)

(58) Field of Classification Search
CPC ..... H04L 63/1475; H04L 67/02; H04L 67/34; G06F 21/556; G06F 21/566; G06F 21/6245
See application file for complete search history.

(56) References Cited

U.S. PATENT DOCUMENTS

| 8,365,291 | B1* | 1/2013 | Le | G06F 8/433 726/25 |
| 2005/0021791 | A1* | 1/2005 | Sakiyama | H04L 63/168 709/229 |
| 2007/0136579 | A1* | 6/2007 | Levy | H04L 63/102 713/168 |
| 2012/0167209 | A1* | 6/2012 | Molnar | G06F 21/54 726/22 |
| 2012/0198558 | A1* | 8/2012 | Liu | G06F 21/53 726/25 |
| 2018/0097829 | A1* | 4/2018 | Muttik | H04L 63/1425 |

OTHER PUBLICATIONS

Marius, The Real Impact of Cross-Site Scripting, Dionach, 2016.*
Vogt et al., Cross-Site Scripting Prevention with Dynamic Data Tainting and Static Analysis, 2007.*
Computer Dictionary, Microsoft Corporation, Fifth Edition, 2002, pp. 72.*

* cited by examiner

Primary Examiner — Minh Dinh
(74) Attorney, Agent, or Firm — Fenwick & West LLP (57) ABSTRACT

An application deployment system provides one or pages of an application to a client device. The pages may specify application code for performing functions and presenting content of the application by the client device as well as a reference to third-party code. As users interact with the page on the client device, the user may interact with the page to add sensitive data for transmission to the application deployment system or receive sensitive data from the application deployment system. To detect and prevent inappropriate use by the third party code, messages relating to the third-party code is monitored for requests to send messages that contain information matching the user information. When there is a match, the message may be prevented from transmission or the application developer notified about the sensitive data request.

20 Claims, 3 Drawing Sheets

DETECTING SENSITIVE DATA SENT FROM CLIENT DEVICE TO THIRD-PARTY

BACKGROUND

This invention relates generally to networked applications, and particularly to detecting improper use of sensitive data.

Application deployment systems provide web pages and other resources to client devices for providing an application to the client device. An application represents functions and features provided by the application deployment system in one or more pages generated by the application deployment system for a client device. The application may include various pages such as a homepage for the application, a login page, a create account page, among others. In many pages, the user may provide sensitive user data to the application deployment system. In addition, the application pages may include references to content of third-party code providers. The third-party code may be incorporated to perform various features for the application, but may not have been developed or analyzed by the application development system to determine its behavior. In providing the third-party services, third-party code may be implemented or executed on the client device, or services of the third-party code may be called by the client device.

As one example, the client device retrieves third-party code from the reference provided by the application page and executes the code of the third-party as a part of the application page. When the user enters sensitive data to the application intended for the application deployment system, the sensitive data may be accessible to third-party code and may be improperly transmitted or leaked by the execution of the third-party code to another system. Alternatively, the requested services from a third-party system may be called with a function call that includes sensitive data.

SUMMARY

A client device includes a browser or other application that retrieves pages of content for an application from an application deployment system. The browser may also retrieve third-party code for execution with the application code retrieved from the application deployment system. The client device determines when third-party code attempts to provide sensitive data to other systems other than the application deployment system. The third-party code may execute on the browser or may represent function calls to a third-party service using the sensitive data.

When the client device receives user inputs to a user interface element of the application, the client device identifies the user input and determines whether the input is sensitive data. The input may be identified as sensitive data based on characteristics of the data, such as the number and form of characters in the data, or may be identified based on characteristics of the field in which the data is input. The fields may also be designated to contain sensitive data based on a flag or other identification from the application deployment system, for example from an administrator or other operator of the application deployment system. In additional examples, sensitive data may be identified based on information provided by the application deployment system. As with user-entered data, the data provided by the application deployment system may specify that a field includes sensitive data, or the data may be analyzed according to characteristics of the data. The designation of sensitive data may also be performed by an operator of the application deployment system performing a security scan or other analysis of the executing application to specify sensitive data fields in which a user may enter information or sensitive data provided by the application.

When the third-party code is executed by the client device, requests by the third-party code to transmit messages to third-party systems are monitored to detect or prevent communication of sensitive data. The monitoring may be performed by instrumentation of the code interpreter or by a breakpoint (e.g., in a debugging implementation) to identify messages relating to the third-party. The instrumentation may provide alternative library or operating system functions for invoked functions to monitor the parameters and other characteristics of the system when a message is requested.

The monitoring may then record information about the request (e.g., to report the messaging, or to pause transmission of the message until its analysis). The message to a third-party message is analyzed based on components of the message to determine if the component has portions matching the sensitive data and related to the application deployment system. By analyzing the sensitive data use on the client device and monitoring communications of the third-party code, sensitive data leaks may be more reliably determined and prevented by the client device analysis. The identified requests from the third-party code may be prevented by the client device from transmission to third-party systems, and/or the application deployment system may be notified by the client device of the possible data leak to third-party systems. When third-party systems improperly attempt to send such messages, the third-party code may be removed from the application or the application developers may further investigate the cause of the message.

At the client device executing the application code and the third-party code, the execution is thus monitored to determine user inputs of the application code and other sources of sensitive data and third-party code that may be attempting to communicate those inputs to other systems. The application may be monitored using breakpoints or by instrumenting the execution of the application to add monitoring steps to system or library function calls invoked by the executing code. The monitoring identifies interactions with the code and requests to send messages by third-party code components. This monitoring at the client device permits the analysis of messages by the third-party code used by an application without requiring (or as a supplement to) analysis of the third-party code itself and permits the application developer to determine and prevent third-party use of sensitive data on the application as the application executes at the client device. Thus, the application may be performing its standard behavior during the testing, which may allow behaviors and interactions of the third-party code to exhibit itself that may not be apparent from other analysis of the code.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
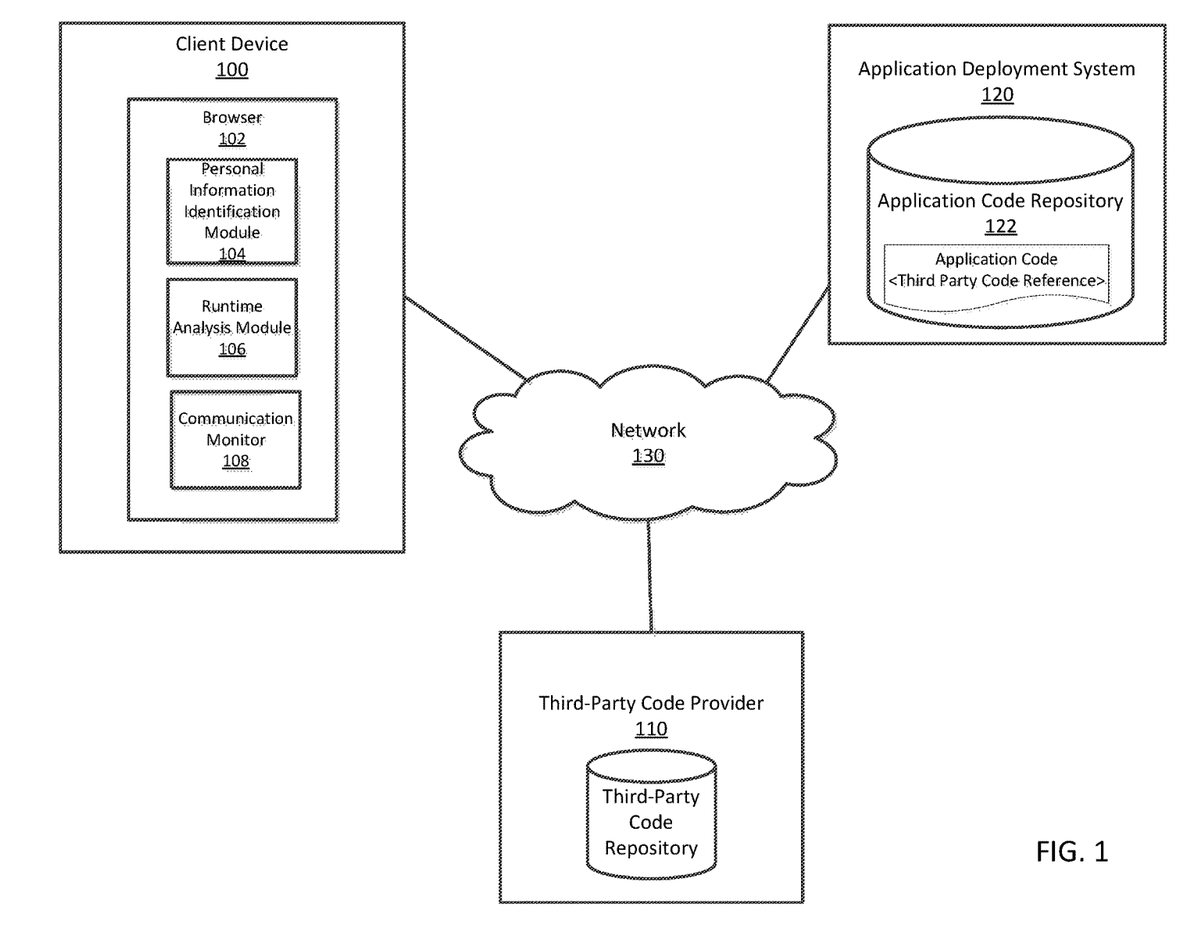
FIG. 1 shows an environment in which a client device accesses an application with third-party code according to one example embodiment.

FIG. 1 shows an environment in which a client device accesses an application with third-party code according to one example embodiment. In this example, a client device 100 accesses services and resources at an application deployment system 120. The set of services and resources accessed at the application deployment system 120 is termed an "application" and represent content and other data retrieved and interacted with by the client device 100 for providing the application to a user of the client device 100. As the user interacts with the application at the client device 100, the application deployment system 120 may include a reference to third-party code stored at a third-party code provider 110. The client device 100 follows the reference to retrieve or use function calls to the applicable third-party code for the application. As the client device 100 provides the application, the user may input user information intended for the application deployment system 120 or the application deployment system 120 may include sensitive information to the user of the client device 100. The client device 100 identifies such sensitive data and monitors third-party code for requests to send messages that may contain the sensitive data.

The client device 100 is a computing device that retrieves and presents data to a user of the client device 100. The client device 100 may be various types of computers, such as a desktop computer, server terminal, mobile device, or tablet. The client device includes a program for retrieving and displaying application content from the application deployment system 120. As one example, this program may be a browser 102, such as a web browser, for retrieving content across a network and processing display of the content for the user of the client device 100. In providing the application, the browser 102 may navigate to one or more pages associated with an application. For example an application may constitute web pages of a domain and provide services related to that domain. Thus, a news application at a news website may include several pages to access news content, to login to the news website, and so forth. Though browser 102 is used as an example herein, a variety of executable programs on the client device 100 may be used consistent with this disclosure. These programs retrieve and execute content for the application and may use and invoke third-party code that may include sensitive data.

The application deployment system 120 provides the application to the client device for presentation by the browser 102. The application may be one or more pages of content provided to the client device, for example via different resource links accessed by the client device 100. For example, when the application is provided as a web page (e.g., as .html, files), the user may navigate among various web pages during use of the application. An individual page of the application may include various resources and content for presentation to the user. The page may also include code for execution or interpretation at the client device 100. In addition to the code executed at the client device 100, the application deployment system 120 may also provide some processing and other functions for the application based on messages provided from the client device 100. In this example, the application as whole may be provided via a combination of functions executed on the client device and functions executed on the application deployment system 120. For example, the application code may include a mark-up language file having instructions for formatting and presenting resources, as well as instructions for retrieving resources for the page. The application code may also include various scripting languages or other executable instructions for the browser device to provide methods for interacting with the application or application deployment system 120. Such example scripting languages include JavaScript, or XUL (XML User Interface Language). The application code may control the presentation of the application, as well as behaviors of the client device 100 accessing and executing the application code. The application deployment system 120 may maintain the application code in an application code repository 122. The application code stored at the application code repository may include references, such as a uniform resource locator (URL) to resources and other links instructing the client device 100 to retrieve the referenced contents. Though termed a "repository," the application code may be dynamically generated by the application deployment system 120, for example responsive to user inputs at the device or based on execution of user inputs transmitted to the application deployment system 120 for execution.

The references in the application code may include a reference to code maintained at a third-party code provider 110. This code at the third-party code provider 110 is termed third-party code and is maintained at a third-party code repository. The application deployment system 120 may include third-party code to provide additional features and services to the application, such as social networking services, user interaction information, security services, and the like. These third-party services may provide useful information and support to the application provided by the application deployment system 120, and may receive messages from the client device to provide these services. However, this third-party code may execute on the client device similar to application code, and the developer of application code may not be able to verify the actual behavior of the third party code. The third-party code may be retrieved and executed on the client device 110, or may be invoked by the client device 100 by a message requesting a function to be performed by the third-party system. As an example of requesting the function performed by the third-party system, the application code may include a reference to the thirdparty system as an http request, such as: "http://metrics.com/analyze?input=myusername" to invoke a function provided by a third-party at domain "metrics.com." For example, The components of client device 100 includes a browser 102 for accessing resources, and various components for verifying that sensitive data entered by a user is not improperly transmitted to third party systems. As noted above, the browser is one example program executing on the client device 100 in which third-party messages may be analyzed. Additional example programs include other programs or applications that use web or internet-based protocols to interact with the application deployment system 120 and third-party code provider 110.

These systems are typically remotely disposed from one another, and are connected via a network 130. Each of these various systems communicates via a network 130. The network 130 may be a wired or wireless communications network, and may include a combination of public and private networking channels. While shown as communicating through a single network 130, in practice various components may communicate via separate networks.

Figure 2:
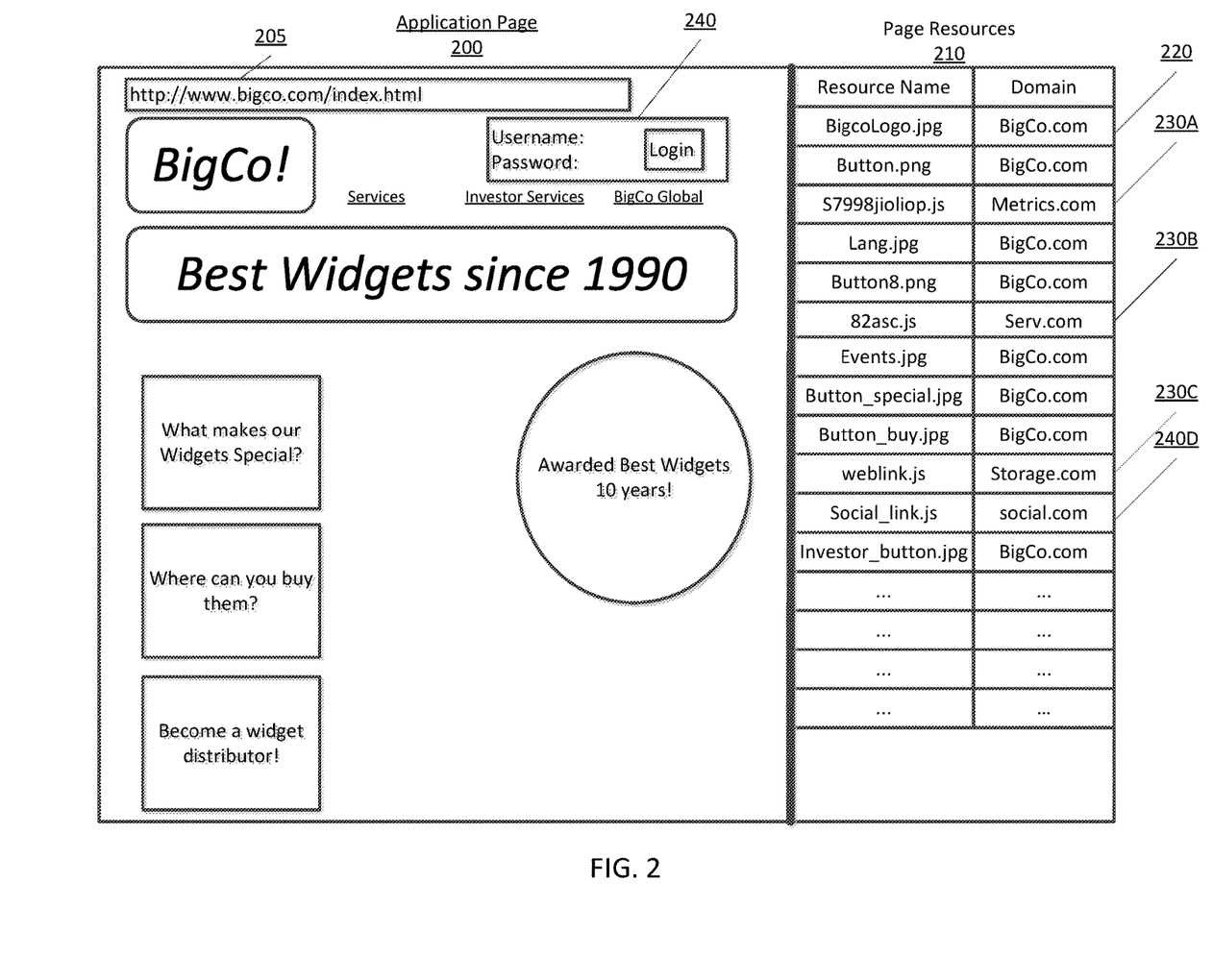
FIG. 2 illustrates an application page presented by a browser to a user of a client device and related resources for the page retrieved by the browser.

FIG. 2 illustrates an application page 200 presented by a browser 102 to a user of a client device and related resources for the page retrieved by the browser 102. When the browser 102 receives the designated resources for a page, the browser retrieves resources specified by a reference and presents the page to the user as an application page 200. In this example, the display includes a navigation window 205 specifying the page accessed by the browser 102. In this example, the page corresponds to "index.html" at domain www.bigco.com. The application code may specify the organization and layout of the application page 200, which may be further affected by any third-party code. The page is associated with a set of page resources 210 specified by the page and retrieved by the browser. The page resources 210 specify various resources for the page retrieved for the page presentation. The page resources 210 are shown in FIG. 2 to illustrate the various resources retrieved for displaying the application page 200. The reference and resource information shown in the page resources table 210 are typically not displayed to the user in generating the application page 200 for display. In this example, the page resources include a name and a domain at which the resource is located. In this example, the application development system 120 is accessed at a domain "BigCo.com." In this example, resources retrieved from the "BigCo.com" domain are associated with the application development system, while other domains are associated with third-party systems, such as third-party code provider 110. For example, application resource 220 references a picture, "BigcoLogo.jpg" located at the domain BigCo.com, and may be identified by the client device as associated with the domain of the application page. I.e., these resources may be identified as provided by the application by the client device. In contrast, other resources, such as third-party resources 230A-D, are resources that are retrieved from a domain other than the application domain. Third-party resource 230A, for example, designates a .js file specifying javascript code for retrieval and execution with the application page 200. In addition to retrieved resources of the third-party for interpretation by the client device, the client device may also request function calls or other services by the third-party using data of the client device. This data may include sensitive data and the message requesting third-party execution is analyzed for sensitive data as well.

The application page 200 may include various interface elements for the user to interact with the application, such as by a text field or selection of a graphical element such as an icon. In certain fields, a user may enter or input information that is sensitive or personal to the user. In this example, the application page 200 includes login and password entry fields 240 for a user to enter a login and password for the application. Additional types of personal information may include names, addresses, personally-identifying information (e.g., identification numbers), financial account numbers, and other types of sensitive information. When such sensitive data is entered in the field, this information is intended for the application and application deployment system 120. In addition, sensitive information may be included by the application development system 120 and presented to a user. For example, after logging in to the application page 200 shown in FIG. 2, sensitive data may be provided to the user by the application deployment system 120.

Returning to FIG. 1, the client device 100 includes components for verifying whether such sensitive data is transmitted to the third-party code provider 110 by the third-party code. In this example, the browser 102 includes a personal information identification module 104, a runtime analysis module 106, and a communication monitor 108. In this example, these components are illustrated as components of the browser 102. In other examples, these components may monitor the execution of the browser as separate processes or applications executing on the client device 100. In addition, certain of these components may be remotely disposed, for example at the application deployment system 120, or at another remote system for analysis. Thus, in another example, the browser 102 may include a module for identifying and monitoring third-party message requests and user-entered information. The third-party message requests and user-entered information may be sent to a remote system for performing analysis of the third-party message requests to determine whether it requests sending sensitive data to the third-party.

The personal information identification module 104 identifies user-entered or application-provided information in the browser that constitutes sensitive data for which the client device 100 may identify transmission to third-party systems. The personal information identification module 104 may identify sensitive data in several ways. For user-entered sensitive data, the personal information identification module 104 identifies fields or user interaction elements of the user interface in which the user may enter information. These fields may be identified as containing sensitive information in the page, such as in the file describing resources for the page (e.g., an .html file). These fields may thus be specified by the page as calling for sensitive data entry by the user. Additionally, the personal information identification module 104 may identify the name or other characteristics of the user interface element to determine whether an entry in that field will constitute sensitive data. When a user interface element is identified as a field in which sensitive data may be entered, the user's entry in that field is identified as sensitive data.

As an alternative or supplement, entered information itself may be analyzed to determine sensitive data. The personal information identification module 104 may also monitor data entered in a field and analyze whether the data constitutes sensitive data. The monitored data may be analyzed, using regular expressions or matching algorithms to determine if the entered information in the user interface element is similar to formatting or includes terms indicative of sensitive data. Different types of sensitive data may be represented by different formatting. For example, financial information may be determined by comparing the user's entry to formatting consistent with financial information. Credit cards, for example, typically have 15 or 16 numerical digits. When a user's entry consists of 15 or 16 numerical digits in the field, the personal identification module 104 may identify the entry as a credit card number. As another example, sensitive data for an address may be determined by analyzing whether terms or words are included in the field consistent with an address, for example by looking up terms in a dictionary for the field. This analysis of the user's entry in the field may be performed for fields which are not already designated to include personal information.

By analyzing field and user entry information, the personal identification module 104 identifies sensitive data entered by a user in the application and intended for the application deployment system 120. Sensitive data may also be identified for application-provided information. This sensitive data may include account information, customer lists, financial data, and so forth that is provided by the application to the client device. The application-provided information may be identified by similar means as user-entered information. For example, the application may designate or specify that certain provided information constitutes sensitive information by a flag or other designation when providing the sensitive data. Alternatively, the application-provided information may be automatically analyzed for correspondence to types of sensitive data as noted above.

The runtime analysis module 106 monitors execution of application code and third-party code that dynamically control the browser 102. For example, the runtime analysis module 106 monitors execution of scripting languages such as JavaScript or XUL that are interpreted by the browser 102. In addition to monitoring execution of the scripting language, the runtime analysis module 106 may also include modifications of an interpreter for the scripting language. The runtime analysis module 106 monitors the execution of the scripting languages to identify requests from to send messages to third-party domains, which may originate from third-party code or from application code. Once identified, a message request to be sent to a third party may be analyzed to identify sensitive data in the request and prevent transmission of that message to third-party systems.

As one example, the runtime analysis module 106 identifies third-party code or a message invoking third-party code based on the domain of the retrieved code that differs from the application domain. For example, in FIG. 2, the domain 230B of the .js resource "S7998jioliopjs" is "Metrics.com" and is retrieved from that third-party source. The runtime analysis module 106 identifies the third-party code and monitors for messaging requests originating from this executing code. The runtime analysis module 106 may also identify requests that invoke or otherwise request execution of third-party code at a third-party system, such as messages including a function call or other request to a third-party system.

To monitor the execution, the runtime analysis module 106 may implement instrumentation or breakpoints of the execution of the code. To monitor the application code and identify modules loaded by the code, the runtime analysis module 200 may add hooks to the interpreter of the code prior to its execution, or may execute the code in a modified runtime environment that provides instrumentation to function calls in the interpreter.

When a message request is generated by the application or third-party code, the code may request a function or library call to send the message. For example, the application code may include a message to invoke third-party code at a third-party system. To identify whether the message includes sensitive data, the function or library call for sending a message at the client device is modified and a breakpoint or other instrumentation is triggered on the function or library call. When a breakpoint is used and is reached by the message request, the execution pauses and the runtime analysis module 106 identifies the message request and sends the message request to the communication monitor 108 to determine whether the request includes sensitive data. In one example, the browser 102 executes application and third-party code in a debugging environment (e.g., with a debugger) to implement a breakpoint of the messaging request.

In addition or as an alternative to a breakpoint, the runtime analysis module 106 obtains information about the message request by instrumenting function and library calls external to the code. For example, when the application may request a library function to send a message, the third-party code may request use of or an instantiation of a class or function that forms a part of a basic library for the language or script.

To instrument these function and library calls, the runtime analysis module 106 may modify the library functions to add profiling of the code and message request. In this way, the third-party code may execute within a modified runtime environment due to the modified library functions and identify message requests from the third-party code.

In another example, the runtime analysis module 106 is a portion of application code included by the application deployment system 120 in application code 122, such that execution of the application code implements the runtime analysis module 106 to monitor the third-party code retrieved and included in the application code. In this case, the application code may cause execution of the application code implementing the runtime analysis module 106 prior to retrieval of the third-party code, such that execution of the third-party code may be monitored and modified by the runtime analysis module 106 included in the application code.

When the identified message requests from the third-party code are directed to third-party systems, rather than the application deployment system 120 or a domain associated with the application deployment system, the communication monitor 108 determines whether the message contains sensitive data. The communication monitor retrieves a list of entered sensitive data from the personal information identification module 104. Then the communication monitor analyzes the message requests to identify components of the message request, such as fields or parameters of the message request. For example, the message request may comprise a http GET request specifying various parameters of the GET request. These parameters are parsed to determine whether the contents of any components match the sensitive data. The message may include other types of message requests, such as a POST request or other requests to send data to a third-party system. In addition to HTTP requests, other messaging types may also be analyzed, such as simple object access protocol (SOAP) requests. When the communication monitor 108 identifies personal identification in a requested message to a third party system, the communication monitor 108 may take various actions, such as blocking transmission of the message or notifying the application deployment system 120.

In addition to the configuration discussed above, which may be used in a production or a test environment, in one configuration, additional interactions between the client device 100 and the application code may be determined in a test environment. The test environment may be used to identify which fields contain sensitive data, as well as whether sensitive data was transmitted (or attempted to be transmitted) to third-party systems. In another example, the field may be identified as containing sensitive data through analysis or testing of the application. To test the application, the pages of the application may be interacted with and analyzed during execution to determine sensitive information in portions of the page. As the page is interacted with, the various user interface elements and presented application information may be collected and stored by the testing system. After interacting with the pages in the test environment, the fields and application information identified during the test may be presented for a tester or developer to designate which fields contained sensitive information. These fields may then be identified by the application page, for example by including the designation in the page itself. The identified fields and application information may then be specified for use later in the test environment (e.g., to verify whether sensitive data is transmitted) or may designate fields or other information to be included in transmission to the client device 100 for the personal information identification module 104 to determine sensitive information entered into that field or provided by the application.

In the test environment, the browser 102 or execution of application and third-party code may be operated via a debugger to implement breakpoints in the third-party code. The message requests from the third-party code provider may be identified and compared to the sensitive data previously provided in the test, which may be analyzed after the test occurs for the developer to identify use of the sensitive data by the third-party code.

Figure 3:
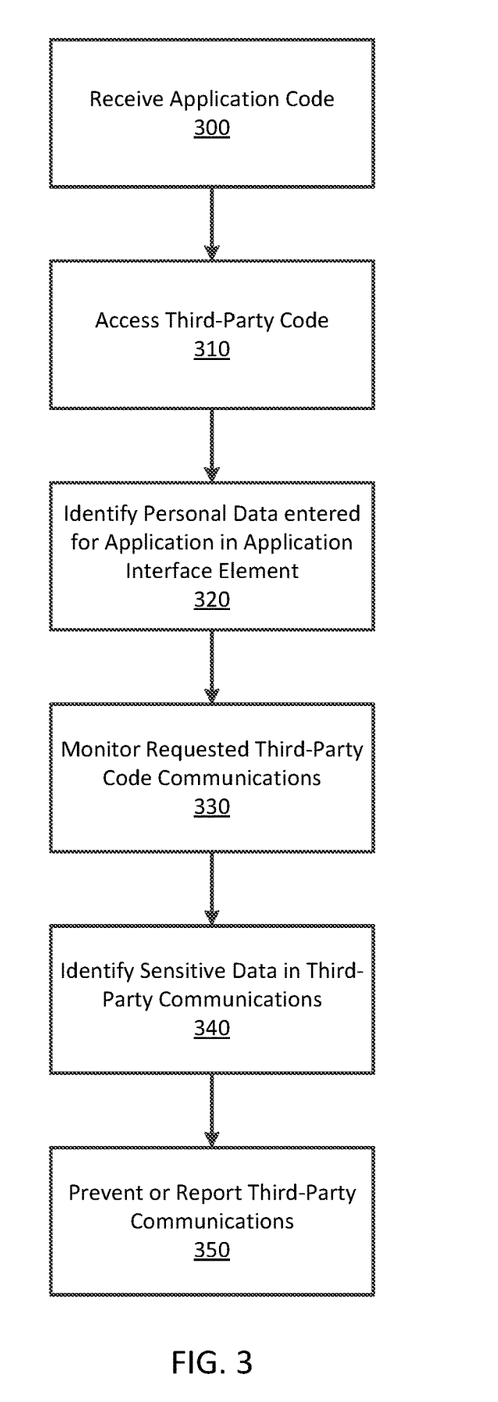
FIG. 3 illustrates a sample flowchart for determining sensitive data in third-party code according to one embodiment.

FIG. 3 illustrates a sample flowchart for determining sensitive data in third-party code according to one embodiment. Initially, a client device may access and retrieve 300 application code, for example using a browser. After retrieving the application code, the application code may designate third-party code for execution with the application code to provide a page of the application to a user. The browser follows the reference to the third-party code to access 310 the third-party code and begin execution or interpretation of the third-party code or requests to invoke third-party code for servicing a function. As the user interacts with the application, the user may enter sensitive data in a user interface element provided by the application code or may receive sensitive data from the application deployment system 120. This sensitive data is identified 320 based on the field itself or the type of information entered by the user or provided by the application deployment system 120. As the application executes, the client device monitors 330 requested communications. The message requests from the third-party code or to invoke third-party code at the third-party code provider is analyzed to identify 340 whether the requested messages from the third-party code include sensitive data that was entered for an element of the application code or provided by the application. After identifying the sensitive data in the requested message, the message may be prevented or reported 350.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for detecting sensitive data leaks in a client device, comprising:
   receiving application code for execution on the client device from an application deployment system;
   accessing third-party code specified in the application code, the third-party code executed with the application code on the client device;
   identifying sensitive data entered in a user interface element associated with the application code or received from the application deployment system;
   during execution of the application code by the client device, monitoring a message request generated by the third-party code or generated by invoking a third-party code function, wherein the message request is addressed to a third-party system;
   identifying the sensitive data in the message request by analyzing components of the message request; and
   when the sensitive data is identified in the message request addressed to the third-party system, reporting the message request to the application deployment system or preventing transmission of the message request.

2. The method of claim 1, wherein the application code and third-party code are executed by a browser on the client device while accessing a page at the application deployment system.

3. The method of claim 1, wherein the sensitive data is identified based on a field of the application code, or a format of the sensitive data entered in the user interface element.

4. The method of claim 1, wherein the monitoring is performed by instrumentation of an interpreter of the third-party code.

5. The method of claim 1, wherein the monitoring is performed by a breakpoint in an interpreter of the third-party code.

6. The method of claim 1, wherein the message request comprises a request to send a hypertext transfer protocol (HTTP) or simple object access protocol (SOAP) message.

7. The method of claim 1, wherein the client computer executes a browser to execute the third-party code and the application code.

8. A non-transitory computer-readable medium comprising instructions that, when executed by a processor, cause the processer to perform steps of:
   receiving application code for execution on the client device from an application deployment system;
   accessing third-party code specified in the application code, the third-party code executed with the application code on the client device;
   identifying sensitive data entered in a user interface element associated with the application code or received from the application deployment system;
   during execution of the application code by the client device, monitoring a message request generated by the third-party code or generated by invoking a third-party code function, wherein the message request is addressed to a third-party system;
   identifying the sensitive data in the message request by analyzing components of the message request; and
   when the sensitive data is identified in the message request addressed to the third-party system, reporting the message request to the application deployment system or preventing transmission of the message request.

9. The non-transitory computer-readable medium of claim 8, wherein the application code and third-party code are executed by a browser on the client device while accessing a page at the application deployment system.

10. The non-transitory computer-readable medium of claim 8, wherein the sensitive data is identified based on a field of the application code, or a format of the sensitive data entered in the user interface element.

11. The non-transitory computer-readable medium of claim 8, wherein the monitoring is performed by instrumentation of an interpreter of the third-party code.

12. The non-transitory computer-readable medium of claim 8, wherein the monitoring is performed by a breakpoint in an interpreter of the third-party code.

13. The non-transitory computer-readable medium of claim 8, wherein the message request comprises a request to send a hypertext transfer protocol (HTTP) or simple object access protocol (SOAP) message.

14. The non-transitory computer-readable medium of claim 8, wherein the client computer executes a browser to execute the third-party code and the application code.

15. A system comprising:
   a processor for executing instructions;
   a non-transitory computer-readable medium comprising instructions that, when executed by the processor, cause the processes to perform steps of:
   receiving application code for execution on the client device from an application deployment system;
   accessing third-party code specified in the application code, the third-party code executed with the application code on the client device;
   identifying sensitive data entered in a user interface element associated with the application code or received from the application deployment system;
   during execution of the application code by the client device, monitoring a message request generated by the third-party code or generated by invoking a third-party code function, wherein the message request is addressed to a third-party system;
   identifying the sensitive data in the message request by analyzing components of the message; and
   when the sensitive data is identified in the message request addressed to the third-party system, reporting the message request to the application deployment system or preventing transmission of the message request.

16. The system of claim 15, wherein the application code and third-party code are executed by a browser while accessing a page at the application deployment system.

17. The system of claim 15, wherein the sensitive data is identified based on a field of the application code, or a format of the sensitive data entered in the user interface element.

18. The system of claim 15, wherein the monitoring is performed by instrumentation of an interpreter of the third-party code.

19. The system of claim 15, wherein the monitoring is performed by a breakpoint in an interpreter of the third-party code.

20. The system of claim 15, wherein the message request comprises a request to send a hypertext transfer protocol (HTTP) or simple object access protocol (SOAP) message.

* * * * *

UNITED STATES PATENT AND TRADEMARK OFFICE
CERTIFICATE OF CORRECTION

| | | |
|---|---|---|
| PATENT NO. | : 10,491,629 B2 | Page 1 of 1 |
| APPLICATION NO. | : 15/425985 | |
| DATED | : November 26, 2019 | |
| INVENTOR(S) | : Tamir Shavro | |

It is certified that error appears in the above-identified patent and that said Letters Patent is hereby corrected as shown below:

On the Title Page

Under Abstract (57), Line 1, delete "one or pages of" and insert --one or more pages of--.

In the Claims

Column 11, Line 12, Claim 8, delete "the processer to perform" and insert --the processor to perform--.

Column 12, Line 10, Claim 15, delete "cause the processes to perform" and insert --cause the processor to perform--.

Column 12, Line 25, Claim 15, delete "analyzing components of the message; and" and insert --analyzing components of the message request; and--.

Signed and Sealed this
Fifth Day of May, 2020

Andrei Iancu
*Director of the United States Patent and Trademark Office*